June 16, 1953     K. G. CARROLL ET AL     2,642,537
APPARATUS FOR DETERMINING COATING THICKNESS
Filed Dec. 22, 1949
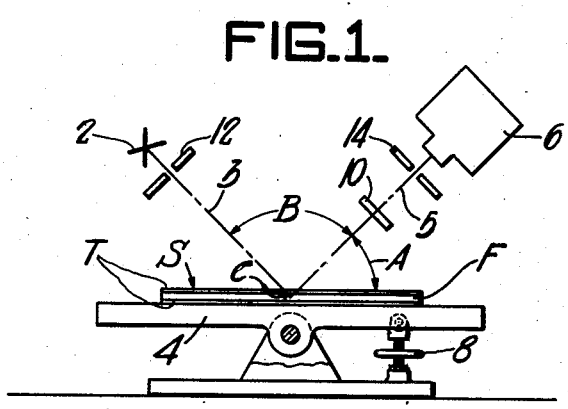
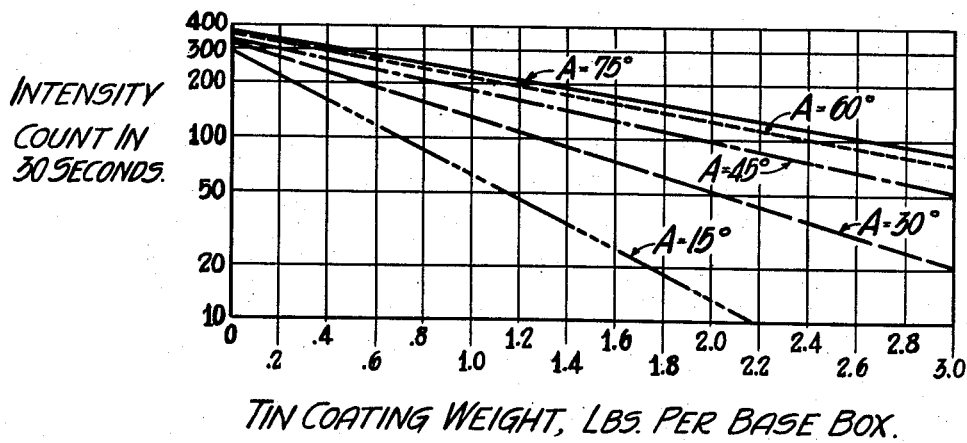
Inventors:
KENNETH G. CARROLL and
DONALD S. MILLER,
by: Donald E. Dalton
their Attorney.

Patented June 16, 1953

2,642,537

UNITED STATES PATENT OFFICE 2,642,537

APPARATUS FOR DETERMINING COATING THICKNESS

Kenneth G. Carroll, Cranford, and Donald S. Miller, Westfield, N. J., assignors to United States Steel Corporation, a corporation of New Jersey Application December 22, 1949, Serial No. 134,568

2 Claims. (Cl. 250—52)

Our invention relates to the determination of coating thickness and more particularly to a method and apparatus for determining the thickness of tin coating on tin plate. Heretofore the amount of tin in the coating of tin plate was determined by chemical tests. While chemical tests are accurate they are time consuming and consequently operational control of the tinning equipment is seriously handicapped. Chemical tests also destroy the sample, thus making it impossible to check test or test for other properties on the same sample. This handicaps research work. It has been suggested that the tin coating weight be determined by an X-ray diffraction method in which the intensity of characteristic diffraction line from the base metal serves as a quantitative measure of coating thickness. It has been found, however, that this method is limited to cases where the coatings are deposited on a backing material which is sufficiently fine grained and randomly oriented to produce a pure powder pattern under X-ray irradiation. Such ideal conditions are not present in commercial tin plate, and thus this method had proved unsuitable for the determination of the coating thickness of tin plate.

It is an object of our invention to provide a method of determining tin coating thickness on tin plate without destruction of the tin plate sample and in which grain size and orientation of the base and coating materials do not affect the results.

Another object is to provide apparatus for carrying out our method.

These and other objects will be more apparent after referring to the following specification and attached drawings, in which:

Figure 1 is a schematic view of the apparatus of our invention; and

Figure 2 is a graph showing the relationship of the weight of coating on tin plate to the intensity of a beam of fluorescent X-rays emitted by the ferrous base of the tin plate and the effect of the angle of emergence of the beam on this relationship, weight of coating being shown on the linear scale of the abscissa in pounds per base box, intensity on the logarithmic scale of the ordinate in counts registered by a Geiger counter over a time period of 30 seconds, and the angle of emergence by the labels on the individual curves.

Referring more particularly to the Figure 1, the reference numeral 2 indicates an X-ray tube arranged to direct a primary X-ray beam along the line 3 at the tin plate sample S which is mounted on a tiltable table 4. A radiation detector 6, such as a Geiger counter, photomultiplier tube or ionization gage is provided adjacent the sample S on the same side thereof as the tube 2 so as to receive a beam of X-rays emerging from the sample S along the line 5. An adjusting screw 8 is provided on the table 4 for changing the emergent angle A between the detector and the sample S independently of the angle B between the detector and the tube 2. If desired, the X-ray tube and the detector can be mounted on independent bases pivotally supported at C and provided with separate adjustments whereby the angles A and B can be independently set. A manganese filter 10 is preferably provided between the sample S and detector 6 in order to screen-out unwanted radiation. Collimation devices 12 and 14 are preferably provided adjacent the tube 2 and Geiger counter 6 to permit a beam of X-rays to reach the sample and the counter respectively while further minimizing unwanted rays. These devices may be sheets with a slot therein.

Briefly, the method of our invention consists of irradiating a sample of tin plate with X-rays of such wave length and intensity that they will excite characteristic iron radiation in the steel base of the sample and then measuring the intensity of a beam of the iron radiation after it emerges through the tin surface. The iron radiation in passing outwardly through the tin is partially absorbed thereby and we have found that when measured under the conditions hereinafter defined, the measured intensity gives an accurate measure of the thickness of the tin coating carried by the sample and provides for measurement of the coating thickness in a fraction of the time required by the methods employed heretofore.

In carrying out our invention the X-ray tube 2 through the collimating device 12 bombards a small area of the tin plate sample with a primary X-ray beam of sufficient intensity and proper wave length to cause the steel base of the sample to strongly emit characteristic iron K-series X-rays. The target of the X-ray tube may be of copper, molybdenum, or tungsten with the latter being preferred for reasons which will subsequently be explained. The intensity of a beam of the secondary iron X-rays is measured by means of the radiation detector 6. The beam measured is defined by the collimating device 14 which permits only that group of the rays which leave the tin surface along a line of travel substantially parallel to the line 5 from an area of the plate equal to the normally projected area of the collimating devices to reach the detector. For ease of measurement it is preferred to use the filter 10 to screen out the iron K-beta radiation which is generated by the primary beam. Thus the beam reaching the detector is substantially monochromatic. The radiation detector measures the intensity as a count of the energy impulses transported by the beam. A Geiger counter and scaling circuit is preferred for this purpose. These are well known and will not be described in detail. The measurement involves a count of the energy impulses reaching the counter during a fixed time period. The longer the time period of counting, the higher the accuracy. For present purposes we have found that a time period of 30 seconds provides the necessary precision and permits the tests to be conducted rapidly. The time of counting can be controlled manually or conventional timing switches (not shown) can be provided. The scale of the counter can be calibrated to read coating weight in pounds per base box or the count can be converted to thickness of coating by means of calibration graphs such as shown in Figure 2.

To achieve the necessary precision of measurement the intensity of the emergent iron beam must be well above the natural background count of the counter so that it is desirable to use as high an intensity of primary beam as possible. For accurate determination of coating thickness it is essential that the counter receive only radiation which has originated in the steel base and has passed through the coating. Reflected or stray primary beam radiation and fluorescent radiation from the coating itself must therefore be eliminated or prevented. To prevent radiation from the coating metal the tube voltage must be limited to values below which fluorescence of the coating metal occurs. In the case of tin this limit is about 30 kilovolts. Reflected or stray primary beam radiation is minimized by the collimating devices 12 and 14. However, the amount of stray or scattered beams is also a function of the characteristics of the primary beam. We have found therefore that it is advantageous to use an X-ray tube having a target which produces general rather than characteristic radiation. For example, a tungsten target tube produces an X-ray beam in which characteristic radiation is substantially absent and may be operated at up to 30 kilovolts, the voltage at which tin fluorescence becomes serious, whereas a molybdenum target tube must be operated below 17 kilovolts to prevent serious interference by scattered characteristic radiation. The permissible increase in the tube voltage when using a tungsten target results in a decided increase in intensity and consequently makes for more accurate measurement of the intensity of the iron K-alpha radiation, particularly in the case of heavy weights of tin coatings.

The angle B between the incident and emergent beams is not a critical factor but we have found that an angle of 90° is both convenient and satisfactory. The angle A is of considerable importance principally because of its effect on the path length of the iron K-alpha X-ray beam through the tin. When this angle is near 90° the beam traverses the coating almost normal to the surface, hence the slope of the intensity versus thickness curve is small. As angle A is decreased the beam traverses the coating more obliquely and the slope of the curve increases, this effect is illustrated in the curves of Figure 2. When it is desired to measure small changes in coating thickness, we have found that it is best to have the angle A small and that when it is desired to cover a wide range of thicknesses with lesser accuracy, it is best to have the angle large. For commercial tin coatings the value of angle A should be between 15° and 45°. This range of angles enables accurate determination of tin coating thicknesses between 6 and 210 micro-inches (1.01 to 3.5 pounds per base box).

As indicated in the foregoing discussion, the apparatus for practicing our invention must be calibrated. Calibration may be accomplished by inserting a succession of samples bearing known coating weights and measuring the intensity of the iron K-alpha X-rays emitted while maintaining constant conditions in the X-ray source and detector system. For example, if a tungsten target tube is used, the voltage of the tube is regulated to some value between 15 and 30 kilovolts, the table 4 is set to provide an emergent angle A of say 30°, and the time of counting is fixed at preferably 30 seconds. In carrying out the calibration it is preferable to measure the intensity at several spots on each sample and then determine the weight of coating of the sample by chemical tests. The results of the calibration may be plotted in graph form as indicated in Figure 2, or the detector can be provided with a scale reading directly weight of coating in pounds per base box or coating thickness in micro-inches. Following calibration, the apparatus may be used to determine the weight of coating on unknown samples under the conditions used in the calibration.

While we have shown and described one embodiment of our invention, it is apparent that other adaptations and modifications may be made without departing from the scope of the following claims.

We claim:
1. Apparatus for determining the thickness of tin coating on a ferrous base sample comprising a support for said sample, an X-ray tube arranged to direct a primary X-ray beam on the ferrous base, a radiation detector arranged on the same side of the ferrous base for detecting iron fluorescent radiation, means for rotating said support to change the angle between the detector and ferrous base independently of the X-ray tube, and a manganese filter between the detector and ferrous base.

2. Apparatus for determining the thickness of tin coating on a ferrous base sample comprising a support for said sample, an X-ray tube arranged to direct a primary X-ray beam on the ferrous base, a radiation detector arranged on the same side of the ferrous base for detecting iron fluorescent radiation, a collimating device between said ferrous base and said detector in alignment with said detector, and means for rotating said support to change the angle between the detector and ferrous base independently of the X-ray tube.

KENNETH G. CARROLL.
DONALD S. MILLER.

References Cited in the file of this patent

UNITED STATES PATENTS

| Number | Name | Date |
|---|---|---|
| 2,079,900 | Cohn | May 11, 1937 |
| 2,428,796 | Friedman | Oct. 14, 1947 |
| 2,449,066 | Friedman | Sept. 14, 1948 |
| 2,521,772 | Beeghly | Sept. 12, 1950 |

OTHER REFERENCES

Structure of Metals—C. S. Barrett 1943 Edition McGraw-Hill Book Co., N. Y., pages 56–57. Copy in Div. 54.